(12) United States Patent
Milliken et al.

(10) Patent No.: US 6,490,629 B1
(45) Date of Patent: Dec. 3, 2002

(54) SYSTEM AND METHOD FOR SCHEDULING THE TRANSMISSION OF PACKET OBJECTS HAVING QUALITY OF SERVICE REQUIREMENTS

(75) Inventors: Walter C. Milliken, Dover, NH (US); Steven Kohalmi, Newton, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/170,275

(22) Filed: Oct. 13, 1998

(51) Int. Cl.[7] .............................................. G06F 13/00
(52) U.S. Cl. ..................................................... 709/232
(58) Field of Search ............................... 709/232–235, 709/228, 236; 370/235, 397, 398; 707/3; 345/356; 710/54

(56) References Cited

U.S. PATENT DOCUMENTS

| | | | | |
|---|---|---|---|---|
| 5,521,916 A | * | 5/1996 | Choudhury et al. ........ | 370/414 |
| 5,533,020 A | | 7/1996 | Byrn et al. | |
| 5,870,584 A | * | 2/1999 | Bennett ........................... | 707/3 |
| 5,956,341 A | * | 9/1999 | Galand et al. .............. | 370/412 |
| 5,959,993 A | * | 9/1999 | Varma et al. ................ | 370/397 |
| 6,005,866 A | * | 12/1999 | Lincoln ....................... | 370/398 |
| 6,028,843 A | * | 2/2000 | Delp et al. .................. | 370/235 |
| 6,032,207 A | * | 2/2000 | Wilson ........................ | 710/54 |
| 6,058,114 A | * | 5/2000 | Sethuram et al. ........... | 370/397 |
| 6,075,791 A | * | 6/2000 | Chiussi et al. .............. | 370/412 |
| 6,094,435 A | * | 7/2000 | Hoffman et al. ............ | 370/414 |
| 6,104,700 A | * | 8/2000 | Haddock et al. ............ | 370/235 |
| 6,111,579 A | * | 8/2000 | Alimpich et al. ........... | 345/356 |
| 6,154,446 A | * | 11/2000 | Kadambi et al. ........... | 370/239 |
| 6,157,967 A | * | 12/2000 | Horst et al. .................... | 710/19 |
| 6,181,706 B1 | * | 1/2001 | Anderson et al. ........... | 370/412 |
| 6,188,698 B1 | * | 2/2001 | Galand et al. .............. | 370/412 |
| 6,195,361 B1 | * | 2/2001 | Kondoh et al. ............. | 370/412 |

* cited by examiner

*Primary Examiner*—David Wiley
(74) *Attorney, Agent, or Firm*—Leonard Charles Suchyta; James K. Weixel

(57) ABSTRACT

A method for managing the transmission of packet objects distinguishes between packet objects having and not having quality of service (QoS) requirements for transmission over a logical channel. Packet objects for a logical channel having QoS requirements are placed in a sorted tree queue based on its scheduled departure time and on a weighting system related to the QoS requirements. Packet objects for a logical channel only requiring best effort transmission are place in a FIFO queue. Each logical channel is associated with either a sorted tree queue or a FIFO queue.

38 Claims, 4 Drawing Sheets

SYSTEM AND METHOD FOR SCHEDULING THE TRANSMISSION OF PACKET OBJECTS HAVING QUALITY OF SERVICE REQUIREMENTS

BACKGROUND OF THE INVENTION

A. Field of the Invention

The present invention relates generally to systems for transmitting information over the Internet, and more particularly to scheduling the transmission of different types of traffic over the Internet.

B. Description of the Related Art

With the advent of highly-sophisticated digital audio and video applications run on modem multimedia workstations, the ability to run these applications over the Internet has become more desirable. However, such real-time applications often do not work well across the Internet because of variable queuing delays and congestion losses, and because the Internet, as conceived, offers only a very simple point-to-point, best-effort data delivery. As a result, before real-time applications, such as remote video and multimedia conferencing, can be broadly used, the Internet infrastructure must be modified to support real-time quality of service (QoS), which provides some control over end-to-end packet delays.

Another problem with respect to communication over the Internet involves the communication lines. Long haul communications lines are very expensive to use, and major customers usually contract to pay for the use of these lines according to the amount of "time" they wish to have access to these lines rather than by the amount of traffic they send over them. Consequently, it is very important that these customers make the most efficient use of these lines. However, efficient use for a simple "best-effort" queueing approach leads to excessive network delays, which can adversely affect real-time applications. Hence, various forms of packet scheduling have been developed to provide less delay for real-time traffic at higher efficiencies.

With respect to the Internet protocol (IP) QoS problem, prior art solutions have implemented multiple logical FIFOs to handle variously prioritized packets, typically referred to as "priority queuing." The queue with the highest priority traffic would always be checked first for an available packet to send and when this queue was emptied, the next priority queue would be checked for available packets to send, and so forth. Such a priority queuing arrangement, however, does not guarantee service to every packet because high priority traffic can "lock out" low priority traffic indefinitely. In contrast, by giving, for example, all users in a packet-scheduling scheme the same priority, but treating the queues in a round robin fashion, packet scheduling guarantees each user a particular committed amount of bandwidth with which other users cannot interfere. Alternatively, each user can have a variable priority based on whether the user has been under or over-utilizing their guaranteed bandwidth. The weighted fair queuing (WFQ) algorithm provides such a scheme.

SUMMARY OF THE INVENTION

A system and method consistent with the present invention distinguishes between packet objects having and not having quality of service (QoS) requirements for transmission over a logical channel. Packet objects for a logical channel having QoS requirements are placed in a sorted tree queue based on its scheduled departure time and on a weighting system related to the QoS requirements. Packet objects for a logical channel only requiring best effort transmission are placed in a FIFO queue. Each logical channel is associated with either a sorted tree queue or a FIFO queue.

A method consistent with the present invention for managing the transmission of a packet object determines whether a tag associated with the packet object indicates that the packet object includes quality of service (QoS) requirements for transmission and stores the packet object in a sorted tree queue based on the determination.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments consistent with the invention and, together with the description, explain the advantages and principles of the invention. In the drawings.

DETAILED DESCRIPTION OF THE INVENTION

Figure 1:
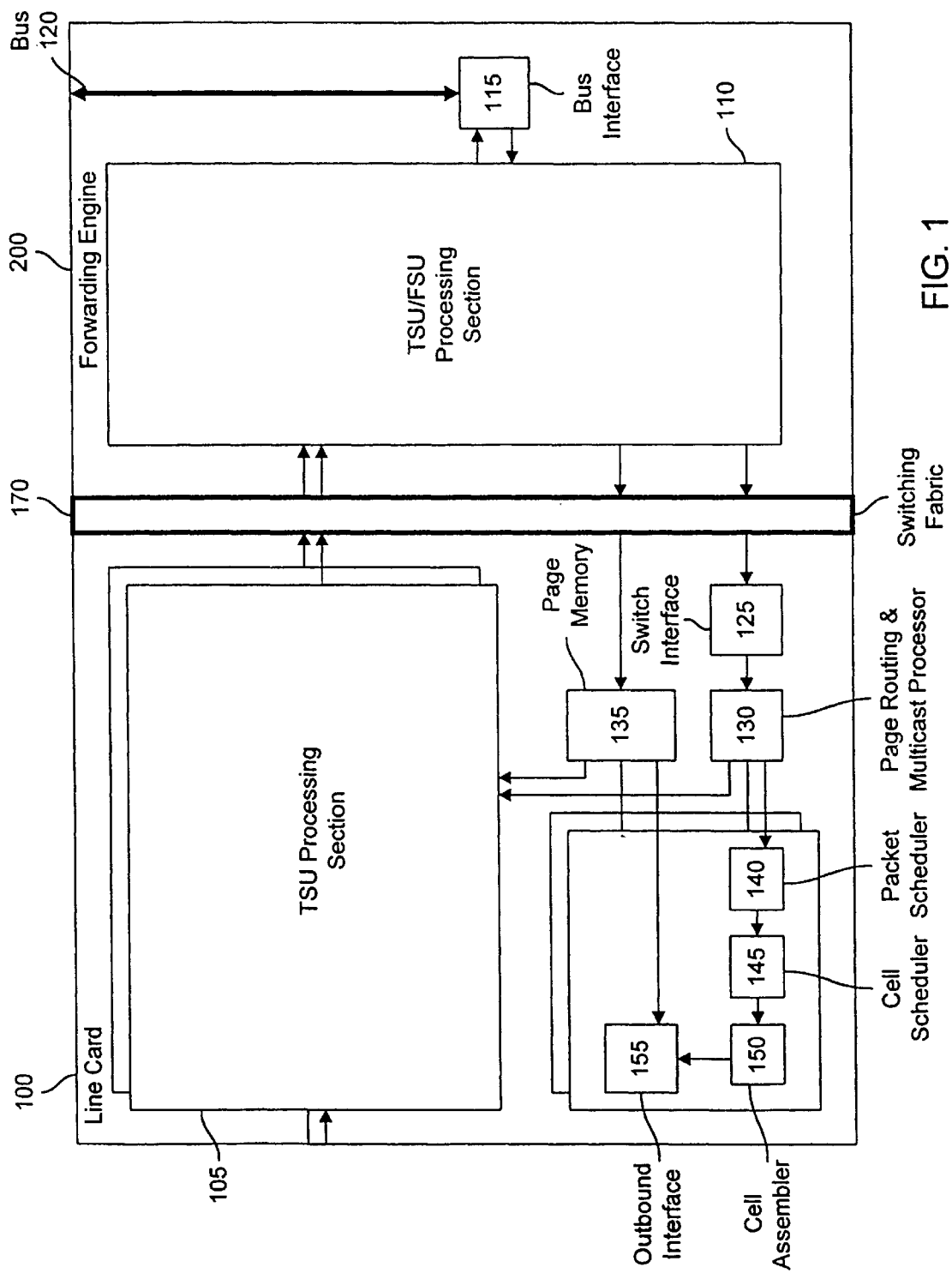
FIG. 1 is a block diagram of a data flow management system consistent with the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

FIG. 1 shows a block diagram of a data flow management system consistent with the present invention. The data flow management system includes a line card 100, a forwarding engine 200 and a switching fabric 170 coupling line card 100 to forwarding engine 200. Line card 100 includes a to switch unit (TSU) processing section 105, a from switch unit (FSU) page receipt and switch interface 125, an FSU page routing and multicast processor 130, an FSU page memory 135, an FSU packet scheduler 140, an FSU cell scheduler 145, an FSU cell assembler 150, and an outbound interface 155. Forwarding engine 200 includes a TSU/FSU processing section 110, a bus interface 115 and a bus 120.

TSU processing section 105 receives traffic, for example, from the Internet and passes the received traffic to TSU/FSU processing section 110 via switching fabric 170. After processing the received traffic, TSU/FSU processing section 110 forwards the traffic to switch interface 125, which forwards the outbound traffic to FSU page routing and multicast processor 130. In addition, packet and updated header information is passed from TSU/FSU processing section 110 to FSU page memory 135. Generally, packet scheduler 140 receives packet traffic and operates on the packet traffic to calculate relative times at which each of the packets will be transmitted. The packets are then sorted by transmission order and passed to cell scheduler 145 in the form of packet objects. Cell scheduler 145 assigns absolute transmission times to the received objects and queues them for transmission at these absolute times. Cell assembler 150 receives the transmitted packet objects one cell at a time, encapsulates each cell with necessary header information and passes each cell to the outbound interface 155 for transmission over a network.

Figure 2:
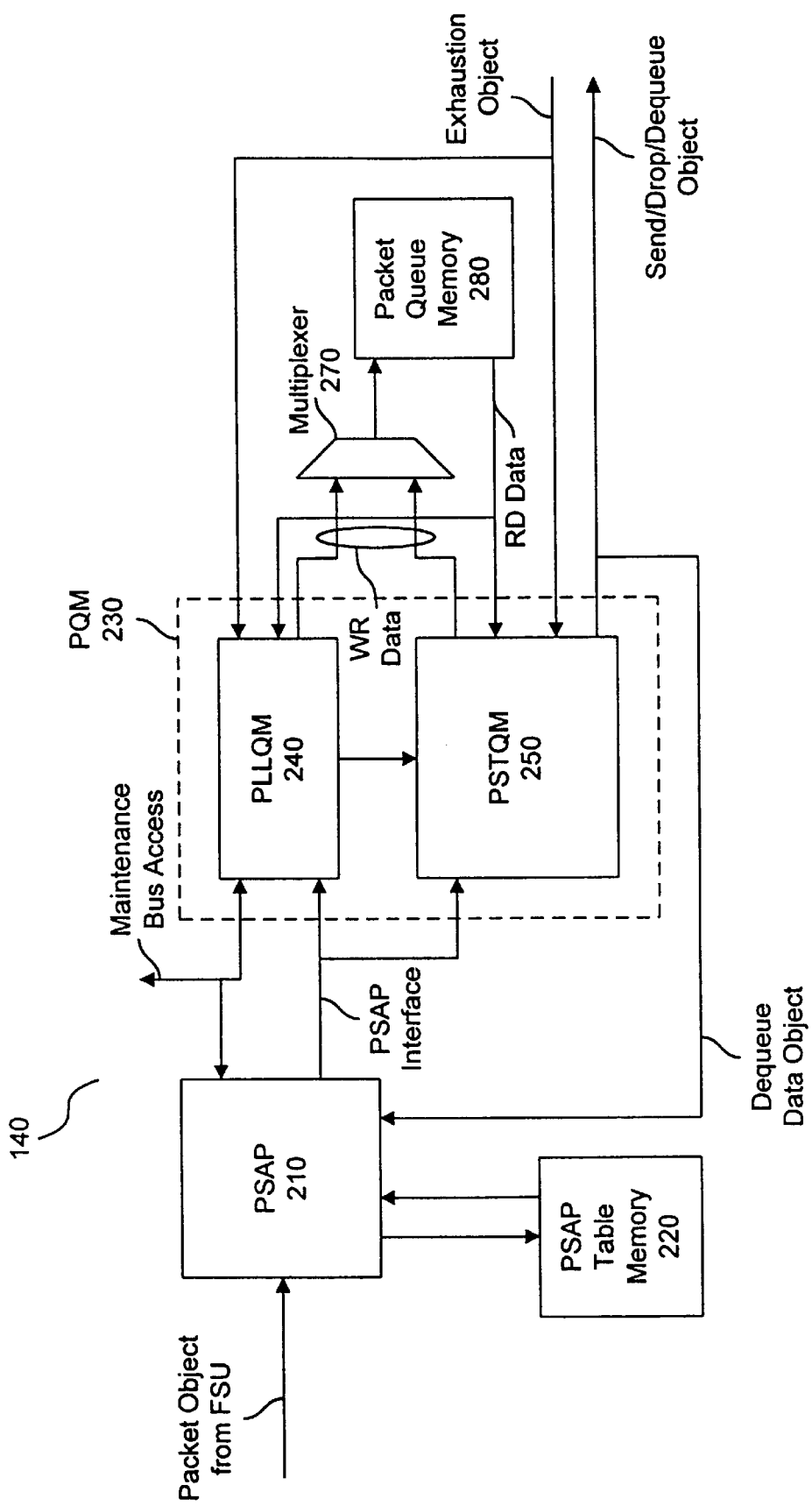
FIG. 2 is a block diagram of the packet scheduler of the data flow management system of FIG. 1.

FIG. 2 is a block diagram of packet scheduler 140 showing all of its major functional elements and signal flow between those elements. A packet schedule algorithm processor (PSAP) 210 receives packet objects from FSU page routing and multicast processor 130 and performs per-packet processing for every packet sent out. A PSAP table memory 220 contains parameters and state information used by PSAP 210 to process the packets. This memory is used primarily to keep tables for each flow, such as destination tag (dtag) information, and for each logical channel index/identifier (LCI). PSAP 210 sends packet objects to a packet queue manager (PQM) 230 for queuing or to be discarded via the PSAP interface.

PQM 230 is composed of two queues, a packet linked list queue manager (PLLQM) 240 and a packet sorted tree queue manager (PSTQM) 250. Each queue can be implemented, for example, as a field programmable gate array (FPGA). Other implementations include microprocessors and application specific integrated circuits (ASICs). PLLQM 240 receives packet objects from PSAP 210 that are associated with "Best Effort" traffic and normal cell bridging traffic, while PSTQM 250 receives packet objects from PSAP 210 that are associated with QoS traffic and certain operation and maintenance functions. Based on information generated by PSAP 210 and exhaustion signals received from cell scheduler 145, PSTQM 250 and PLLQM 240 operate to enqueue and dequeue packet objects into and out of a packet queue memory 280 via address/WR data lines. PLLQM 240 and PSTQM 250 share packet queue memory 280 through a multiplexer 270.

Figure 3:
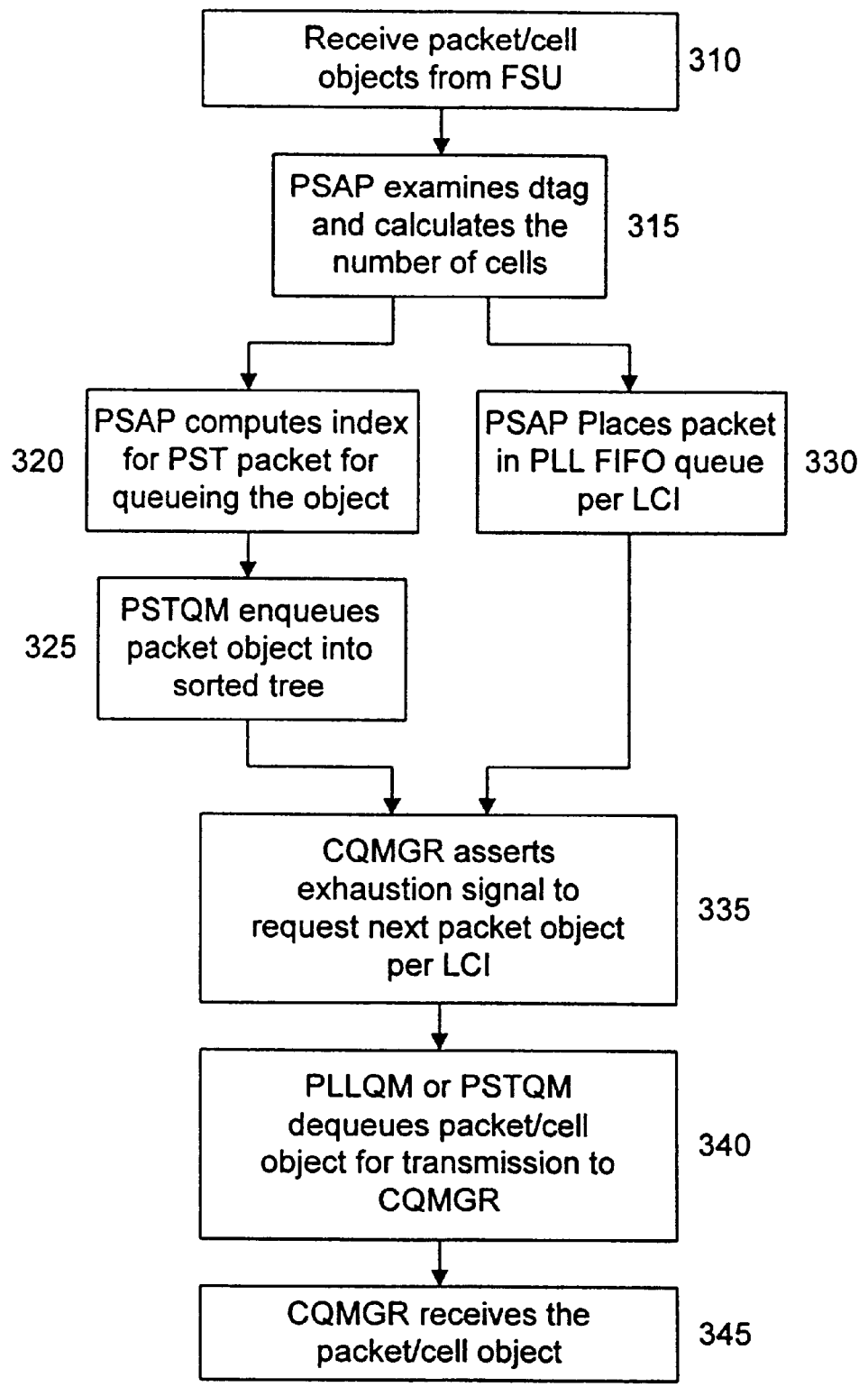
FIG. 3 is a flow diagram of a method used by the packet scheduler of FIG. 2, consistent with the present invention.

FIG. 3 shows a flow diagram consistent with the present invention that illustrates how packet scheduler 140 functions to process the packet objects. First, PSAP 210 receives packet objects from FSU page routing and multicast processor 130 (step 310). PSAP 210 examines the header of the received object to compute the number of cells in the packet and examines the packets dtag, which was previously attached by Forwarding Engine 200, to determine if the packet should be directed to PLLQM 240 or PSTQM 250 to be enqueued (step 315). The dtag is a pointer into PSAP table memory 220 (dtag records) where information regarding how the packet should be directed is contained. The dtag record for this particular packet could indicate that it should be directed to PSTQM 250 because it has certain QoS requirements, or to PLLQM 240 because it can be transmitted by "Best Effort."

Each dtag record also indicates an associated LCI, which identifies the logical channel by which the object will be sent. Further, each object sent to PLLQM 240 has a FIFO dedicated to the LCI associated with that object. Similarly, each object sent to PSTQM 250 has a sorted tree dedicated to the LCI associated with that object. Each LCI has either a PLLQM FIFO or a PSTQM sorted tree dedicated to it, but not both.

If PSAP 210 identifies a packet object consisting of a single cell, it can be processed by packet scheduler 140 using a normal cell bridging process. Essentially, the packet object is queued in a FIFO of PLLQM 240 related to the LCI for the packet object and waits for an exhaustion signal. However, not all packet objects consisting of a single cell are sent directly to a PLLQM FIFO. Those single-cell packet objects associated with operation and maintenance functions can be directed to PSTQM 250. In this case, they are scheduled into the output stream according to the sorted tree process described below.

If the packet is directed to PSTQM 250, then PSAP 210 computes an index value for PSTQM 250 to use when queuing the packet (step 320). The PSAP computes the index value using, for example, the Weighted Fair Queuing Algorithm (WFQ). Briefly, the WFQ algorithm can provide different bandwidth shares to the different types of data associated with the LCI. For example, the algorithm can maintain information regarding the usage of each flow of data. Using this information, the flows of data are transmitted relative to each other based on which flow is the most behind. A more complete description of the WFQ algorithm can be found in a book authored by A. Demers, S. Keshav and S. Shenker entitled, "Analysis and Simulation of a Fair Queuing Algorithm, Internet work: Research and Experience," September 1990, John Wiley & Sons.

After computing the index value, PSAP 210 can send a four word packet object, which includes the index value, to an input FIFO of PSTQM 250. A 20 bit word with the index value is used by PSTQM 250 to enqueue the packet object to the sorted tree of the LCI associated with the packet object (step 325).

Figure 4:
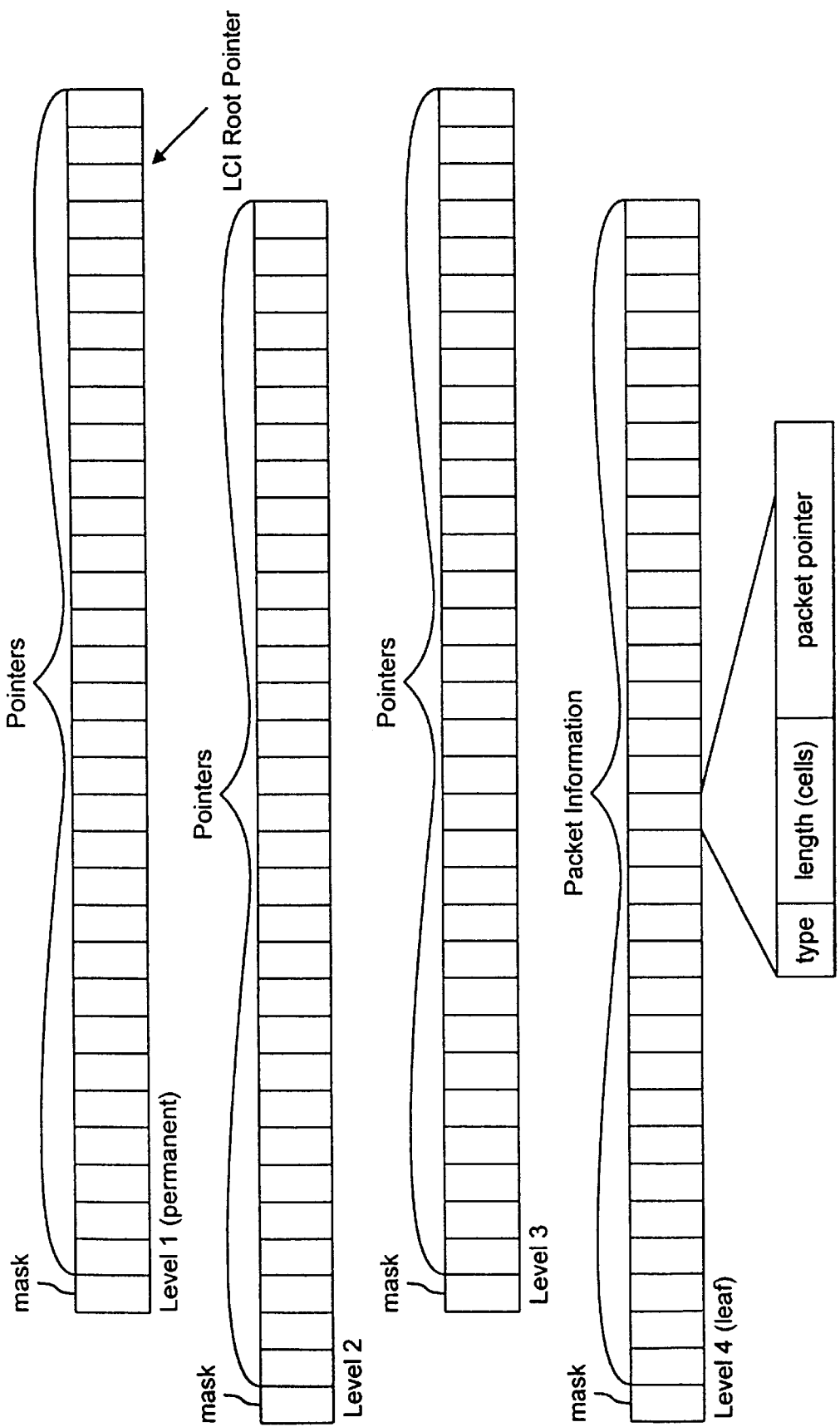
FIG. 4 is a diagram of a sorted tree, consistent with the present invention, used by the packet scheduler of FIG. 2.

FIG. 4 shows a structure of a fast sorted tree, consistent with the present invention, for use with PSTQM 250. The queue structure can be, for example, a 32-ary Tree. Both insertions and removals traverse the tree. Removals could be made faster by maintaining a separate linked list of the current queue elements, but maintaining the tree itself for removals requires most of the memory accesses anyway, such as to maintain back pointers. Generally, it is simpler to do tree traversals for both insertion and removal, and the number of accesses is acceptably low in the typical case.

The basic tree structure for a 32-ary tree for sorting 20-bit values is shown in FIG. 4. The root pointer points to the base of the tree (level 1), and the tree is four levels deep, each level containing 32 (i.e. $2^5$ from one fourth of the 20-bits) pointer slots to the next lower level. The slots in level four are used to store packet information, rather than tree pointers. In addition to the 32 pointer slots, each tree element contains a 32 bit "used slots" mask. Thus, a tree element is a total of 33 32-bit words, a mask word at offset 0, followed by 32 pointers (or packet data slots, for the fourth leaf level).

In addition to one or more 32-ary trees, there must be a free list of tree elements. This free list is pointed to by a global free list pointer (FLP). During insertion operations, any necessary tree elements are created by taking them off the free list (the mask field can be used as the free list chain pointer). During extraction operations, empty tree elements are freed by placing them on the front of the free list. Tree elements on the free list are always 0 in all slots, with only the mask field (the next pointer of the list) non-0. The tail of the list is marked with a 0 next pointer value.

The following is a description of a simple insertion process, which assumes all tree elements needed already exist, and value collisions do not happen. To insert a packet into the queue, the 20-bit sort value is broken into four 5-bit fields, from most to least significant. Each field serves as an index into a level of the tree. The tree is traversed using these indexes to retrieve the corresponding pointer slot from each level, except for the last level, where the corresponding slot is filled with the packet information. The bit corresponding to the leaf slot that is filled is set in the mask field of the leaf tree element.

In this case, there are six reads to traverse the first three tree levels, one mask read and one pointer read for each level, as well as a single read to read the mask at the fourth level, check for collision and prepare for the mask update, and two writes to write the modified mask, and to store packet information into the leaf slot, for a total of nine memory operations. Note that the three tree-traversal reads and the packet information write/mask update are sequentially-dependent, meaning that each must be complete before the address for the next can be known. Most insertions will generally be simple insertions with no need to allocate tree elements.

In the more general case of insertion, one or more needed nodes of the tree may not yet exist. This situation is detected by finding a "0" in the mask bit corresponding to the index value for the current level being traversed. In this case, all following levels need to be allocated and attached to the tree. For each remaining level, a free node is taken from the free list, a pointer to it is written into the slot in the current level corresponding to the index value for this level, and the mask is written back with a "1" bit in the corresponding mask position. Traversal of the next level proceeds as normal, except that the mask does not need to be read because it is known to be all 0s since the node was just allocated. This algorithm proceeds recursively until the leaf level of the tree is allocated and the packet object is stored in the correct location.

The following is a description of a simple extraction process, which assumes no tree elements are emptied by the extraction operation, and value collisions don't happen. The tree is traversed starting at the root pointer. At each level, the mask word is read, and the first bit set in the mask is determined. Most RISC processors, for example, have a "find first one" instruction that can determine the first bit set in the mask. The corresponding pointer is then read to obtain the pointer to the next tree level. At the final level, the value obtained is the packet information.

The mask bit for that slot is then turned off, and the mask written back. Also, a 0, representing an empty condition, is written to the emptied slot.

In this case, there are 8 reads based on a mask read and a slot read at each level, and two writes, one to update the mask, and one to 0 the slot entry, for a total of 10 memory operations. Note that the 8 reads are sequentially-dependent, each has to complete before the address for the next read can be determined. Like the insertions, most extractions will generally be simple extractions having no emptied tree elements. Thus, assuming that the typical case is a simple insertion and simple extraction per packet, the total is 19 memory accesses per packet, for queue operations alone.

In the more general case of extraction, the packet object extracted from the last level may have been the last one stored in that node. This is detected by the fact that the mask to be written back is all 0s. In this case, the node needs to be deallocated instead. The node is put on the free list, and the algorithm returns to the previous level node, where the mask bit corresponding to the newly-freed level (i.e., the one indexed by that part of the index value) is set to 0 and written back. If this would result in this level's mask also being all 0s, the algorithm recurses, freeing this level as well. The recursion stops when the first level is reached. The first level is never freed, but may instead have an all-zeros mask value stored in it.

Returning to FIG. 3, if the packet object is directed to PLLQM 240, the packet object is enqueued into the correct PLLQM FIFO based on its LCI (step 330). PLLQM 240 maintains credit counting functionality (described in more detail below) for each LCI. If a packet arrives at the PLLQM FIFO and PLLQM 240 has credits for this particular LCI, then the packet is immediately sent to a cell queue manager (CQMGR) in cell scheduler 145. Otherwise, the packet object will remain in the FIFO until a credit is received.

The CQMGR asserts an exhaustion object signal to request the next packet object for an LCI (step 335). Upon receipt of the exhaustion signal, PLLQM 240 or PSTQM 250 dequeues the correct packet object and sends this object to the PLLQM output, where it is merged into a SID (send/drop) FIFO for transmission to cell scheduler 145 (step 340). The packet object corresponding to the LCI indicated by the exhaustion signal and having the earliest legal departure time is the packet object that is dequeued and sent to cell scheduler 145. However, if the particular PLLQM FIFO or PSTQM sorted tree corresponding to the exhaustion signal does not have an object, it would count it as a credit to future objects. Thus, the credit counting functionality maintains a count of the number of exhaustion signals received when no object is available to be sent. If an object is subsequently received, the object is sent immediately to CQMGR, and the credit count is decremented. Any object sent from PLLQM 240 or PSTQM 250 is received by the CQMGR (step 345).

It will be apparent to those skilled in the art that various modifications and variations can be made without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A method for managing the transmission of a packet object, comprising the steps of:
   determining whether a tag associated with the packet object indicates that the packet object includes quality of service (QoS) requirements for transmission; and
   storing the packet object in a sorted tree queue based on the determination.

2. The method according to claim 1, wherein the storing step includes the substeps of
   computing an index value for the packet object based on a transmission time of the packet object; and
   storing the packet object in the sorted tree queue based on the index value.

3. The method according to claim 2, wherein the storing step further includes the substeps of
   implementing the sorted tree as an n-ary tree, n being an integer; and
   inserting the packet object in the n-ary tree based on the index value.

4. The method according to claim 3, wherein the inserting step includes the substeps of
   selecting a bit of a mask at each level of the n-ary tree based on the index value;
   determining that a slot in the tree level that corresponds to the selected bit is already present if the value of the selected bit of the mask is set at a predetermined level;
   using information stored in the slot determined to be present as a pointer to a lower level of the n-ary tree;
   storing the packet object in a selected slot of the lowest level of the n-ary tree, the slot being selected according to the index value.

5. The method according to claim 3, further comprising the steps of:
receiving a signal identifying a logical channel requesting a new packet object to be transmitted; and
extracting a packet object having an earliest transmission time from the n-ary tree corresponding to the logical channel identified in the signal.

6. The method according to claim 5, wherein the extracting step includes the substeps of
locating a first bit set in a mask corresponding to a first level of the n-ary tree, wherein each set bit of the mask represents a slot being used in that level of the n-ary tree;
obtaining the information stored in the slot of the first level of the n-ary tree corresponding to the determined first set bit;
using the obtained information as a pointer to a lower level of the n-ary tree;
repeating the locating, obtaining, and using steps for each lower level of the n-ary tree until the lowest level of the n-ary tree is reached;
locating a first bit set in the mask corresponding to the lowest level of the n-ary tree; and
extracting the information from the slot in the lowest level of the n-ary tree corresponding to the first set bit in the mask at the lowest level of the n-ary tree,
wherein the information extracted from the lowest level of the n-ary tree corresponds to the packet object having the earliest transmission time.

7. The method according to claim 6, wherein the extracting step further includes the substep of
resetting the bit in the mask at the last level of the n-ary tree determined to be the first set bit.

8. A computer system for managing the transmission of packet objects over a logical channel, comprising:
a memory for storing packet objects scheduled for transmission, the memory including at least one sorted tree queue;
a processor for determining whether a tag associated with a packet object includes quality of service (QoS) requirements for transmission; and
a queue manager for storing a packet object into a sorted tree queue if the packet object is determined to have QoS requirements for transmission.

9. The computer system according to claim 8, wherein the processor includes means for computing an index value for the packet object based on a transmission time of the packet object, and
wherein the queue manager includes means for inserting the packet object in the sorted tree queue based on the index value.

10. The computer system according to claim 9, wherein the sorted tree queue includes an n-ary tree, n being an integer.

11. The computer system according to claim 10, wherein the means for inserting the packet object includes means for selecting a bit of a mask at each level of the n-ary tree based on the index value;
means for determining that a slot in the tree level that corresponds to the selected bit is already present if the value of the selected bit of the mask is set at a predetermined level;
means for using information stored in the slot determined to be present as a pointer to a lower level of the n-ary tree; and
means for storing the packet object in a selected slot of the lowest level of the n-ary tree, the selected slot being selected according to the selected bit of the mask of the lowest level.

12. The computer system according to claim 8, wherein the queue manager includes means for identifying a logical channel requesting a new packet object to be transmitted and means for extracting a packet object from the sorted tree queue corresponding to the logical channel requesting the new packet object.

13. The computer system according to claim 12, wherein the means for extracting a packet object in the queue manager includes means for dequeuing the packet object having an earliest transmission time.

14. The computer system according to claim 12, wherein the sorted tree queue corresponding to the logical channel requesting the new packet object includes an n-ary tree, n being an integer.

15. The computer system according to claim 14, wherein the means for extracting includes
means for determining the first bit set in a mask at a first level of the n-ary tree, wherein each set bit of the mask represents a slot being used in that level of the n-ary tree;
means for obtaining the information stored in the slot corresponding to the determined first set bit;
means for using the obtained information as a pointer to a lower level of the n-ary tree;
means for repeatedly determining the first bit set in a mask at each lower level of the n-ary tree and using the information corresponding to the determined first bit set as an index to a corresponding lower level of the n-ary tree until the information corresponding to the pointer to the lowest level of the n-ary tree is obtained;
means for obtaining the information from the slot in the lowest level of the n-ary tree corresponding to the determined first set bit in the mask at the lowest level of the n-ary tree,
wherein the information extracted from the lowest level of the n-ary tree corresponds to the packet object having the earliest transmission time.

16. The computer system according to claim 15, wherein the means for extracting further includes means for resetting the bit in the mask at lowest level of the n-ary tree determined to be the first set bit.

17. A method for managing the transmission of a packet object, comprising the steps of:
determining whether a tag associated with the packet object indicates that the packet object includes quality of service (QoS) or best effort requirements for transmission; and
storing the packet object in a sorted tree queue when the tag indicates QoS requirements, and storing the packet object in a First-In-First-Out (FIFO) buffer when the tag indicates best effort requirements.

18. The method of claim 17, wherein the tag includes an associated logical channel identifier (LCI) which identifies the logical channel the packet object will be sent on, and wherein the LCI is dedicated to the sorted tree when the tag indicates QoS requirements.

19. The method of claim 17, wherein when the tag indicates QoS requirements, implementing the sorted tree as an n-ary tree, n being an integer, and the storing step includes the substeps of:
computing an index value for the packet object based on the transmission time of the packet object; and inserting the packet object in the n-ary tree based on the index value.

20. The method of claim 19, wherein the inserting step includes the substeps of:

selecting a bit of a mask at each level of the n-ary tree based on the index value;

determining that one or more needed levels of the tree do not exist if the value of the selected bit of the mask in the tree level that corresponds to the selected bit is not set at a predetermined level;

retrieving the needed tree levels from a free node list, wherein for each needed tree level retrieved, writing a pointer into a slot corresponding to the index value for the current needed tree level being retrieved and setting the selected bit of the mask of the current needed tree level to the predetermined level, wherein the pointer stored in the slot points to a lower level of the n-ary tree; and storing the packet object in a selected slot of the lowest level of the n-ary tree, the slot being selected according to the index value.

21. A computer system for managing the transmission of a packet object, comprising:

means for determining whether a tag associated with the packet object indicates that the packet object includes quality of service (QoS) or best effort requirements for transmission; and means for storing the packet object in a sorted tree queue when the tag indicates QoS requirements, and storing the packet object in a First-In-First-Out (FIFO) buffer when the tag indicates best effort requirements.

22. The computer system of claim 21, wherein the tag includes an associated logical channel identifier (LCI) which identifies the logical channel the packet object will be sent on, and wherein the LCI is dedicated to the sorted tree when the tag indicates QoS requirements.

23. The computer system of claim 21, wherein when the tag indicates QoS requirements, implementing the sorted tree as an n-ary tree, n being an integer, and wherein the means for storing includes:

means for computing an index value for the packet object based on the transmission time of the packet object; and means for inserting the packet object in the n-ary tree based on the index value.

24. The computer system of claim 23, wherein the means for inserting includes:

means for selecting a bit of a mask at each level of the n-ary tree based on the index value;

means for determining that one or more needed levels of the tree do not exist if the value of the selected bit of the mask in the tree level that corresponds to the selected bit is not set at a predetermined level;

means for retrieving the needed tree levels from a free node list;

means for writing a pointer into a slot corresponding to the index value for the current needed tree level being retrieved for each needed tree level retrieved;

means for setting the selected bit of the mask of the current needed tree level to the predetermined level, wherein the pointer stored in the slot points to a lower level of the n-ary tree; and means for storing the packet object in a selected slot of the lowest level of the n-ary tree, the slot being selected according to the index value.

25. A method for managing the transmission of a packet object, comprising the steps of:

determining whether a tag associated with the packet object indicates that the packet object includes quality of service (QoS) requirements for transmission;

computing an index value for the packet object based on a transmission time of the packet object; and storing the packet object in the lowest level of an n-ary sorted tree queue, n being an integer, based on the determination and the index value.

26. The method of claim 25, wherein the packet object has one associated logical channel identifier (LCI), and wherein the n-ary sorted tree is dedicated to the LCI associated with the packet object.

27. The method of claim 26, further comprising the steps of:

receiving a second packet object, wherein the second packet object includes a second tag indicating QoS requirements for transmission for the second packet object; wherein the second tag indicates a second LCI associated with the second packet object;

computing a second index value for the second packet object based on the transmission time of the second packet object;

dedicating a second n-ary sorted tree to the second LCI, n being an integer; and storing the second packet object in the lowest level of the second n-ary sorted tree based on the second tag and second index value.

28. A computer system for managing the transmission of a packet object, comprising:

means for determining whether a tag associated with the packet object indicates that the packet object includes quality of service (QoS) requirements for transmission;

means for computing an index value for the packet object based on a transmission time of the packet object; and means for storing the packet object in the lowest level of an n-ary sorted tree queue, n being an integer, based on the determination and the index value.

29. The computer system of claim 28, wherein the packet object has one associated logical channel identifier (LCI), and wherein the n-ary sorted tree is dedicated to the LCI associated with the packet object.

30. The computer system of claim 29, further comprising:

means for receiving a second packet object, wherein the second packet object includes a second tag indicating QoS requirements for transmission for the second packet object; wherein the second tag indicates a second LCI associated with the second packet object;

means for computing a second index value for the second packet object based on the transmission time of the second packet object;

means for dedicating a second n-ary sorted tree to the second LCI, n being an integer; and means for storing the second packet object in the lowest level of the second n-ary sorted tree based on the second tag and second index value.

31. The method of claim 3, wherein the n-ary tree is dedicated to a logical channel identifier associated with the packet object, and the inserting step includes the substeps of:

selecting a bit of a mask at each level of the n-ary tree based on the index value;

determining that a slot in the tree level that corresponds to the selected bit is already present if the value of the selected bit of the mask is set at a predetermined level;

using information stored in the slot determined to be present as a pointer to a lower level of the n-ary tree; and storing the packet object in a selected slot of the lowest level of the n-ary tree, the slot being selected according to the index value.

32. The computer system according to claim 10, wherein the n-ary tree is dedicated to a logical channel identifier associated with the packet object, and the means for inserting the packet object includes:

means for selecting a bit of a mask at each level of the n-ary tree based on the index value;

means for determining that a slot in the tree level that corresponds to the selected bit is already present if the value of the selected bit of the mask is set at a predetermined level;

means for using information stored in the slot determined to be present as a pointer to a lower level of the n-ary tree; and means for storing the packet object in a selected slot of the lowest level of the n-ary tree, the slot being selected according to the selected bit of the mask of the lowest level.

33. A method for managing the transmission of a packet object, comprising the steps of:

determining whether a tag associated with the packet object indicates that the packet object includes quality of service (QoS) requirements for transmission;

computing an index value for the packet object based on a transmission time of the packet object;

storing the packet object in an n-ary sorted tree queue based on the index value, where n is an integer;

receiving a signal identifying a logical channel requesting a new packet object to be transmitted; and extracting a packet object having an earliest transmission time from the n-ary tree corresponding to the logical channel identified in the signal.

34. A computer system for managing the transmission of packet objects over a logical channel, comprising:

a memory for storing packet objects scheduled for transmission, the memory including at least one sorted tree queue;

a processor for determining whether a tag associated with a packet object includes quality of service (QoS) requirements for transmission; and a queue manager for storing a packet object into a sorted tree queue if the packet object is determined to have QoS requirements for transmission, wherein the queue manager includes:

means for identifying a logical channel requesting a new packet object to be transmitted; and means for extracting a packet object from the sorted tree queue corresponding to the logical channel requesting the new packet object.

35. A method for managing the transmission of a packet object, comprising the steps of:

determining whether a tag associated with the packet object indicates that the packet object includes quality of service (QoS) or best effort requirements for transmission; and storing the packet object in a sorted tree queue when the tag indicates QoS requirements, and storing the packet object in a First-In-First-Out (FIFO) buffer when the tag indicates best effort requirements, wherein the tag includes an associated logical channel identifier (LCI) which identifies the logical channel the packet object will be sent on, and wherein the LCI is dedicated to the sorted tree when the tag indicates QoS requirements.

36. A computer system for managing the transmission of a packet object, comprising:

means for determining whether a tag associated with the packet object indicates that the packet object includes quality of service (QoS) or best effort requirements for transmission; and means for storing the packet object in a sorted tree queue when the tag indicates QoS requirements, and storing the packet object in a First-In-First-Out (FIFO) buffer when the tag indicates best effort requirements, wherein the tag includes an associated logical channel identifier (LCI) which identifies the logical channel the packet object will be sent on, and wherein the LCI is dedicated to the sorted tree when the tag indicates QoS requirements.

37. A method for managing the transmission of a packet object, comprising the steps of:

determining whether a tag associated with the packet object indicates that the packet object includes quality of service (QoS) requirements for transmission;

computing an index value for the packet object based on a transmission time of the packet object; and storing the packet object in the lowest level of an n-ary sorted tree queue, n being an integer, based on the determination and the index value, wherein the packet object has one associated logical channel identifier (LCI), and wherein the n-ary sorted tree is dedicated to the LCI associated with the packet object.

38. A computer system for managing the transmission of a packet object, comprising:

means for determining whether a tag associated with the packet object indicates that the packet object includes quality of service (QoS) requirements for transmission;

means for computing an index value for the packet object based on a transmission time of the packet object; and means for storing the packet object in the lowest level of an n-ary sorted tree queue, n being an integer, based on the determination and the index value, wherein the packet object has one associated logical channel identifier (LCI), and wherein the n-ary sorted tree is dedicated to the LCI associated with the packet object.

* * * * *